United States Patent [19]

Iwanciow

[11] Patent Number: 4,628,010
[45] Date of Patent: Dec. 9, 1986

[54] FUEL CELL WITH STORABLE GAS GENERATOR

[75] Inventor: Bernard L. Iwanciow, Sunnyvale, Calif.

[73] Assignee: The United States of America as represented by the Secretary of the Navy, Washington, D.C.

[21] Appl. No.: 808,776

[22] Filed: Dec. 13, 1985

[51] Int. Cl.$^4$ ............................................. H01M 8/06
[52] U.S. Cl. ......................................... 429/19; 429/17
[58] Field of Search ................. 429/19, 27, 17, 12, 429/13; 423/648 R, 579; 48/61, 20; 422/120, 129, 305

[56] References Cited

U.S. PATENT DOCUMENTS

| | | | |
|---|---|---|---|
| 3,098,769 | 7/1963 | Liebhafsky et al. | 136/86 |
| 3,540,933 | 11/1970 | Boeke | 429/19 |
| 3,578,501 | 5/1971 | Honeycutt | 429/19 X |
| 3,649,360 | 3/1972 | Bloomfield et al. | 136/86 C |
| 3,783,028 | 1/1974 | Cnobloch et al. | 136/86 C |
| 4,037,024 | 7/1977 | Landau | 429/17 |
| 4,068,042 | 1/1978 | Chillier-Duchatel | 429/19 |
| 4,155,712 | 5/1979 | Taschek | 429/19 X |
| 4,261,955 | 4/1981 | Bailey, Jr. | 429/19 X |
| 4,463,063 | 7/1984 | Adlhart | 429/19 |
| 4,569,890 | 2/1986 | Barthel | 429/19 X |

*Primary Examiner*—Anthony Skapars
*Attorney, Agent, or Firm*—R. F. Beers; C. D. B. Curry; S. G. Precivale

[57] ABSTRACT

A fuel cell operable by two gas generators which produce hydrogen and oxygen by oxidation and reduction of hydrogen and oxygen containing salts respectively.

1 Claim, 1 Drawing Figure

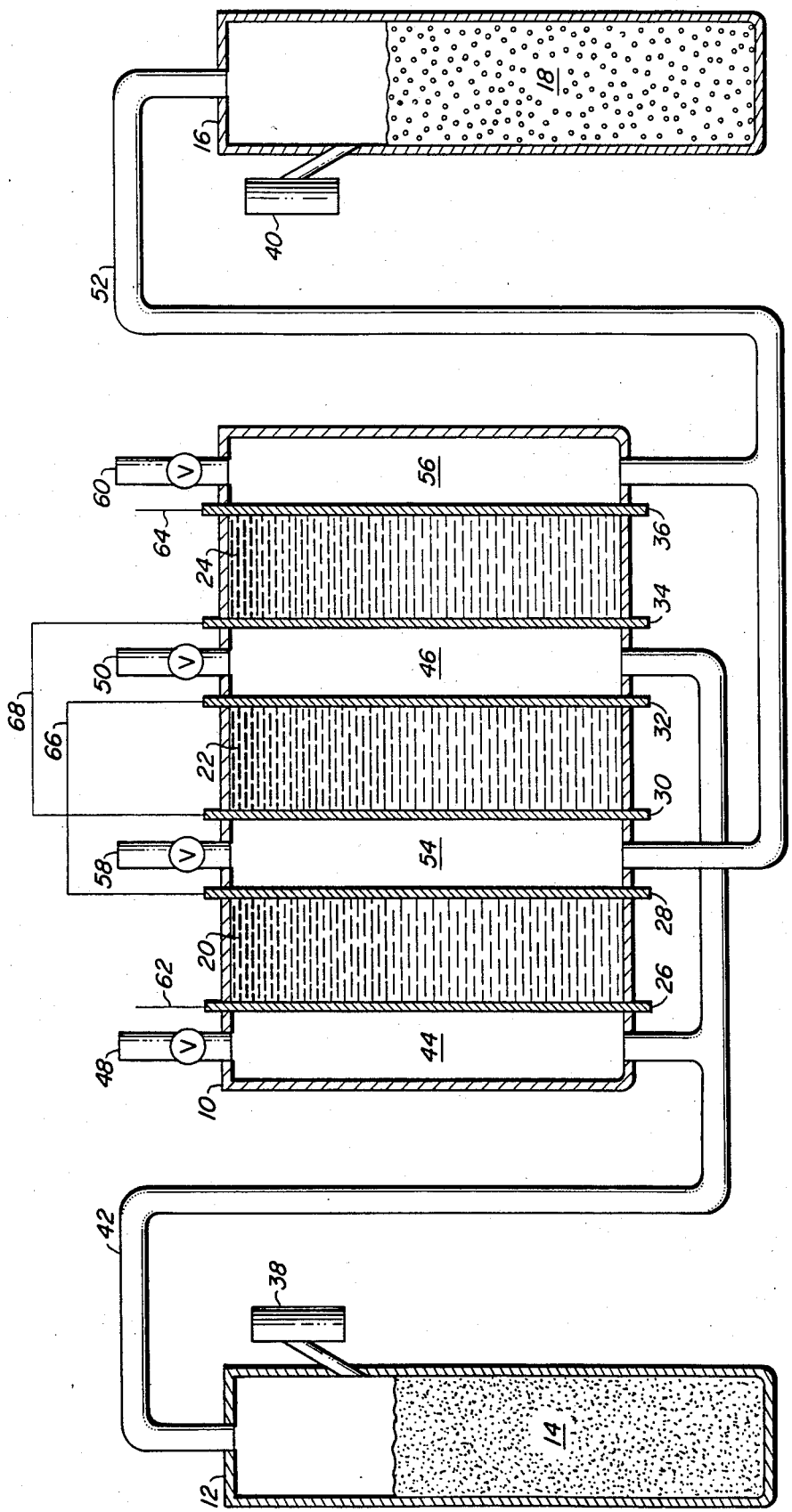

FUEL CELL WITH STORABLE GAS GENERATOR

BACKGROUND OF THE INVENTION

1. Field of the Invention

This invention relates to fuel cells. More particularly, the invention relates to fuel cells based upon the use of solid composition hydrogen and oxygen gas generators. The presently claimed invention is particularly useful in providing a storable high specific energy system.

2. Description of the Prior Art

Various techniques have been attempted in the prior art to develop fuel cells which will supply electrical energy at unusually high energy densities. Some state of the art fuel cells operate with high pressure gas storage, which requires heavy and bulky cylinders, which also pose an explosion hazard in the event of rupture due to severe impact. Other fuel cells utilize cryogenic materials, where an additional system is required to vaporize and supply the materials to the fuel cell.

Specific applications of fuel cells include missile electric power supplies. Due to the weight constraints, state of the art batteries such as those noted above and those such as zinc/silver oxide systems, are often unsatisfactory. The present invention, on the other hand, is lightweight. Rated at the same power level and duration, the fuel cell of this invention is only 30-40% of the weight of state of the art systems.

State of the art methods of operating fuel cells are based upon closed cycle systems where generated water is removed from the cell and condensed to be used as potable water. These systems were designed for very long duration operation generally greater than 500 hours, rather than for short duration, along the order of 1000 seconds.

Most systems operate at steady state, and therefore require auxiliary systems to maintain this state. Temperature control and water removal and condensation are two factors which affect those systems. The present invention utilizes a system which operates in a continuous varying state, ie. the temperature is permitted to rise to its final value and water is allowed to accumulate in the electrolyte, thereby eliminating the need for additional subsystems.

SUMMARY OF THE INVENTION

An object of the present invention is to provide a method of extremely high energy storage.

A further object of the present invention is to provide a fuel cell operable by hydrogen and oxygen.

These and other objects have been demonstrated by the present invention wherein high energy storage is achieved by means of a hydrogen/oxygen fuel cell where the hydrogen and oxygen are stored as solids and released through gas generator reactions.

BRIEF DESCRIPTION OF THE DRAWING

The invention will be described in further detail with reference to the accompanying drawing wherein:

the single FIGURE is a schematic representation of a hydrogen and oxygen gas generator based fuel cell.

DESCRIPTION OF THE PREFERRED EMBODIMENT

This invention entails a hydrogen/oxygen open cycle fuel cell which derives its working fluid from solid gas composition gas generators. This system is capable of delivering 2 kilowatts of power for 1000 seconds at a potential of 35 volts, and therefore is especially suited for use as a primary electric power source for missile power systems.

Key advantages of this invention are the extremely high specific energy that can be achieved with a hydrogen/oxygen fuel cell and the availability of suitable storable gas generator compositions. Chemical gas generator compositions are available that produce essentially pure oxygen and pure hydrogen as the only gaseous effluent (greater than 99.9%).

In the accompanying FIGURE, an embodiment of the system of the present invention is illustrated in schematic form, showing three cells. The hydrogen and oxygen used by the fuel cell assembly 10 are chemically bound as solid components in separate gas generators. The hydrogen gas generator 12 contains the heterogeneous hydrogen gas generating composition 14, comprising a hydrogen containing salt and an oxidizing agent. Particularly good results have been achieved using lithium borohydride ($LiBH_4$) as the salt and iron (III) oxide ($Fe_2O_3$) as the oxidizing agent. The oxygen gas generator 16 contains the heterogeneous oxygen gas generating composition 18, comprising an oxygen containing salt and a reducing agent. Especially suitable is sodium chlorate ($NaClO_3$) as the salt and elemental iron (Fe) as the reducing agent.

Fuel cell assembly 10 is comprised of a plurality of sets of cells connected in series to develop the necessary voltage. The FIGURE only illustrates three cells in series. Depending upon the needs of a particular system, the number of cells may vary. For example, a minimum of 44 cells is required to develop 35 volts. The fuel cell can be fed by one pair of gas generators or sequentially initiated hydrogen and oxygen gas generators. The only critical consideration is that both hydrogen and oxygen gas must be present in the fuel cell assembly simultaneously in order for the cell to be operational. The FIGURE only shows one pair of hydrogen and oxygen generators 12 and 16, which illustrates the general concept.

A suitable electrolyte is a water solution of potassium hydroxide at a concentration of about 35 weight percent, and is stored in chambers 20, 22 and 24. The hydrogen acts as a fuel gas while the oxygen acts as the oxidant gas. The cell membranes 26, 28, 30, 32, 34 and 36, are disks of a porous material such as porous nickel (26 weight percent nickel), having approximately 75% volume porosity. Alternately, composite membranes consisting of powdered teflon and platinum catalyst coated carbon, pressed onto a nickel screen, can be used.

The gas generators can be initiated upon demand by means of igniters 38 and 40. In this manner, the chemical reactions in each generator are initiated and hydrogen and oxygen gas are produced.

Hydrogen is generated by a reaction which occurs in generator 12. The following illustrates the type of reactions involved:

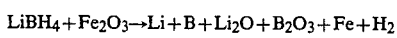

$$LiBH_4 + Fe_2O_3 \rightarrow Li + B + Li_2O + B_2O_3 + Fe + H_2$$

The reactants and all of the products except hydrogen are solids. Gaseous hydrogen then is fed by means of manifold 42 into the fuel cell assembly 10, specifically entering chambers 44 and 46. These chambers are provided with automatic pressure relief valves 48 and 50 respectively. These valved outlets also operate to exhaust any impurities which enter the chamber from the fuel gas.

The compound lithium borohydride (LiBH$_4$) is an excellent chemical for storing hydrogen. The decomposition of this compound into its elements yields approximately 0.185 pounds of hydrogen per pound of starting material. On a volumetric basis, this represents 0.123 g/cc. The corresponding volume storage efficiency of liquid hydrogen is only 0.07 g/cc, so the efficiency of hydrogen storage in LiBH$_4$ is almost double that of liquid hydrogen.

The reaction produces sufficient heat to cause the LiBH$_4$ to decompose thermally, thereby less than the stoichiometric amount indicated above of the iron (III) oxide is required to release all of the hydrogen. The particular reaction defined by the above equation produces hydrogen gas at 10% gravimetric efficiency, but even this composition is efficient for volumetric storage of hydrogen. About 0.111 g/cc of reaction mixture is produced, again exceeding the volumetric storage capacity of liquid hydrogen.

In a manner similar to that of the hydrogen generator composition, a solid gas generator composition is available which produces essentially 100% pure oxygen as the gaseous product. Using sodium chlorate (NaClO$_3$), oxygen is generated by a reaction in generator 16. The following illustrates the type of reactions involved:

$$NaClO_3 + Fe \rightarrow NaCl + Fe_2O_3 + O_2$$

This reaction delivers 34.5% of its weight as pure oxygen, which corresponds to a volumetric storage efficiency of 0.932 g/cc of reaction mixture compared to a volumetric storage efficiency of 1.142 g/cc for liquid oxygen. Gaseous oxygen then is fed by means of manifold 52 into the fuel cell assembly 10, specifically entering chambers 54 and 56. These chambers are provided with automatic pressure relief valves 58 and 60 respectively, which operate like valves 48 and 50. The heat release from this reaction is sufficient to raise the reaction to the thermal decomposition temperature of the mixture therefore even smaller quantities of iron can sustain the reaction. The temperature of the oxygen and the hydrogen gases that are evolved from the generator compositions are adjustable by controlling the amount of elemental iron and iron (III) oxide in the reaction mixture. The gases are typically released at temperatures about 1500° F., but these temperatures can be lowered and the rate of gas release correspondingly decreased within certain limits.

Both of these gas generators react in a manner analogous to the burning of solid propellants, ie. the reaction front advances at a constant rate. The rate of reaction for the oxygen generator is sensitive to the operating pressure. On the other hand, the rate of reaction for the hydrogen generator is not sensitive to the operating pressure. The rate is adequately defined by a power law reaction rate identical to that used for conventional propellants. Furthermore, the typical range of reaction rates is similar to those observed in propellant combustion (ie. 0.1 to 0.6 in/min at 1000 psia).

A major difference between these gas generators and conventional solid propellant gas generators is that a significant quantity of the reaction mixture remains behind as a porous solid mass of reaction products. The reaction residue is sufficiently porous to allow the oxygen and the hydrogen to permeate freely through the reacted bed of spent gas generator products.

A typical operation parameter is a pressure of 75 psia in the gas generators. At this pressure, the vapor pressure of water is about 300 F., however, the hydrogen and oxygen are released at about 1500 F. Fortunately, several factors minimize this apparent problem which would normally result in evaporation of the water in the fuel cell electrolyte, or otherwise force the fuel cell to be operated at extremely high pressures to balance the vapor pressure of water at the elevated temperature. The factors that eliminate this problem are: (1) only a small amount of hydrogen and oxygen are required (about 0.048 and 0.385 pounds of released gas, respectively); (2) the specific heat of oxygen gas, the major constituent, is only about 0.2 cal/g, only 20% of the value for water; (3) the mass of electrolyte is selected to limit the temperature rise to about 170 F., well below the equilibrium vapor pressure of the electrolyte at the cell operating pressure. The added water dilutes the electrolyte by about 10%, therefore only minor changes in the performance of the cell are observed.

The fuel cell reactions that govern power generation in the system are:

$$H_2 + 2OH^- \rightarrow 2H_2 + 2e^- \text{ (anode)}$$

$$1/2O_2 + H_2O \rightarrow 2OH^- - 2e^- \text{ (cathode)}$$

$$H_2 + 1/2O_2 \rightarrow H_2O \text{ (net reaction)}$$

Thus hydrogen and oxygen entering through manifolds 42 and 52 respectively, combine in fuel cell assembly 10 in an alkaline electrolyte to produce water and electric power at about 0.8 volts per cell. For example, hydrogen in chamber 44 reacts with the electrolyte in chamber 20 at the cell membrane/electrode 26. Likewise, oxygen in chamber 54 reacts with the electrolyte in chamber 20 and 22 at the cell membranes/electrodes 28 and 30 respectively, and so forth. Since the reaction is a two electron process, the formation of only a half mole of water, about 9 g, will result in the flow of one Faraday (96500 coulombs) of electricity. Leads 62 and 64 connected to electrodes 26 and 36 respectively, are used to deliver electrical current to apparatus supplied by the cell assembly. Leads 66 and 68 operate to connect the individual cells in series.

Combining the cell voltage with the coulombic output results in a specific power density (theoretical) of 1620 watt-hours per pound of water generated. Moreover, the voltage, coulombic and thermodynamic efficiencies of the hydrogen/oxygen fuel cell are all high, with the principal loss being the voltage efficiency at high current drains. Generally, the voltage efficiency remains at approximately 60–80%, while the coulombic and thermodynamic efficiencies remain near 100%, thereby yielding an overall cell efficiency of about 60–80%. In comparison, a standard zinc/silver oxide battery yields a theoretical power density of approximately 230 watt-hours per pound of reactants consumed, but only at an efficiency of 35%, thereby degrading the delivered power density to about 80 watt-hours per pound of reactants consumed. Thus, the delivered power density of the hydrogen/oxygen fuel cell is about 16 times as great as that of the zinc/silver oxide battery.

The foregoing description has been set forth merely to illustrate the invention and is not intended to be limiting. Since modification of the described embodiment incorporating the spirit and substance of the invention may occur to persons skilled in the art, the scope of the invention should be limited solely with respect to the appended claims and equivalents.

What is claimed is:

1. A system for providing gaseous hydrogen and oxygen to a hydrogen/oxygen fuel cell, the combination which comprises:
   (a) a hydrogen/oxygen fuel cell assembly;
   (b) a hydrogen gas generator having a first heterogeneous mixture comprising lithium borohydride and iron oxide contained therein;
   (c) a means to initiate said first mixture to generate gaseous hydrogen;
   (d) a means to feed said gaseous hydrogen to said hydrogen/oxygen fuel cell;
   (e) an oxygen gas generator having a second heterogeneous mixture comprising sodium chlorate and elemental iron contained therein;
   (f) a means to initiate said second mixture to generate gaseous oxygen; and
   (g) a means to feed said gaseous oxygen to said hydrogen/oxygen fuel cell.

* * * * *